United States Patent [19]

Sakano et al.

[11] Patent Number: 4,920,930
[45] Date of Patent: May 1, 1990

[54] SYSTEM FOR BLOW-BY GAS RETURN TO THE COMBUSTION CHAMBER OF AN ENGINE

[75] Inventors: Kenji Sakano; Hideyuki Nakashima; Hiroo Sakanaka; Kazutoshi Okamoto, all of Sakaishi, Japan

[73] Assignee: Kubota Limited, Osaka, Japan

[21] Appl. No.: 133,250

[22] Filed: Dec. 9, 1987

Related U.S. Application Data

[63] Continuation of Ser. No. 626,785, Jul. 2, 1984, abandoned.

[30] Foreign Application Priority Data

Jun. 30, 1983 [JP] Japan ............... 58-102392[U]

[51] Int. Cl.⁵ .................................. F01M 13/00
[52] U.S. Cl. ........................ 123/41.86; 123/573
[58] Field of Search ............... 123/41.86, 572, 573

[56] References Cited

U.S. PATENT DOCUMENTS

| | | | |
|---|---|---|---|
| 4,011,846 | 3/1977 | Gagliardi | 123/572 |
| 4,453,525 | 6/1984 | DeBruler | 123/573 |
| 4,459,966 | 7/1984 | Sakano et al. | 123/573 |

Primary Examiner—Noah P. Kamen
Attorney, Agent, or Firm—Lowe, Price, LeBlanc, Becker & Shur

[57] ABSTRACT

A system for blow-by gas return to the combustion chamber of an engine according to the present invention including an oil separator with an inlet communicating with an outlet through a diffusion chamber and a filter element; said oil separator communicating with the crankcase of the engine through a breather and an inlet pipe, and also communicates with the intake manifold of the engine through an outlet pipe, so as to separate the oil from the blow-by gas almost completely. The oil separator and the inlet and outlet pipes are disposed in a space directly over the cylinder head of the engine and the intake manifold, so as to prevent ice accumulation therein by the radiation and convection of engine heat thereon. The diffusion chamber of said oil separator is also in communication with the atmosphere by an atmospheric passage so as to prevent the flow of oil into the combustion chamber when unusually large quantities of blow-by gas are produced and the back pressure in the intake manifold becomes unusually low.

5 Claims, 2 Drawing Sheets

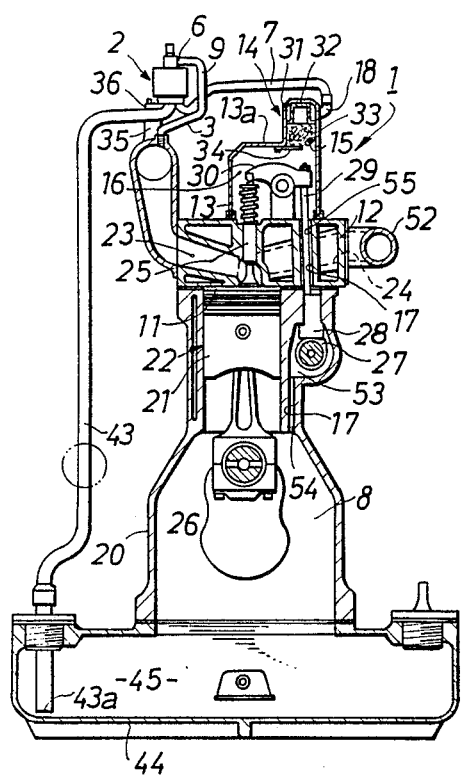
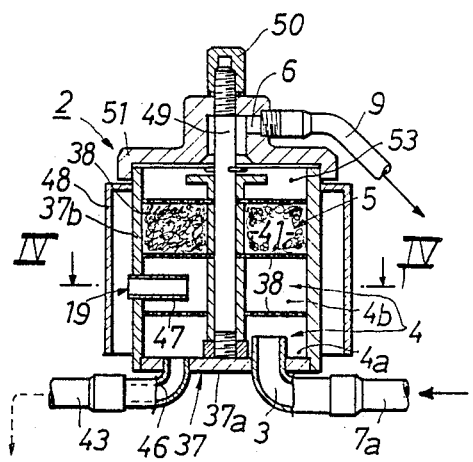
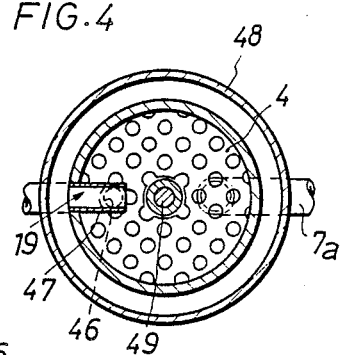
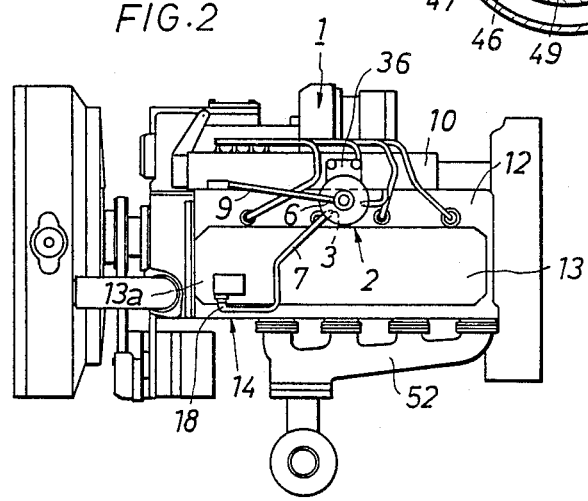

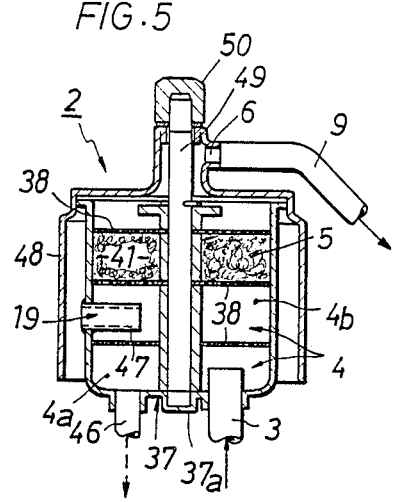
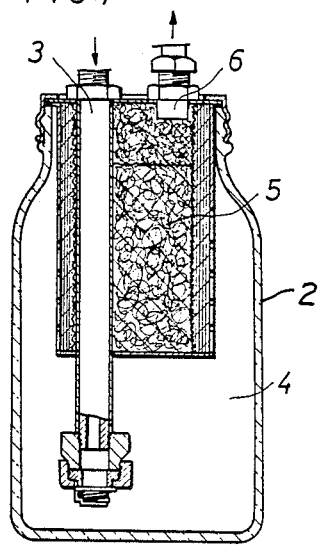
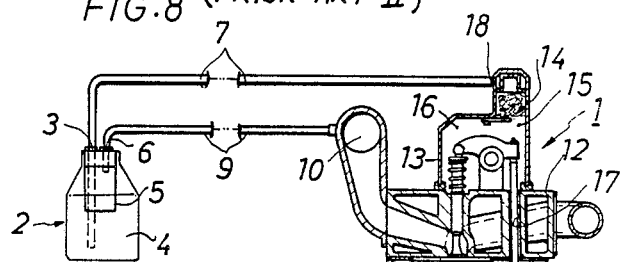
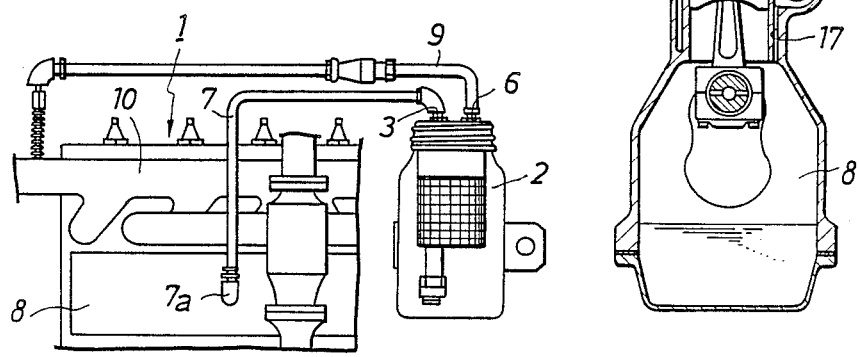

SYSTEM FOR BLOW-BY GAS RETURN TO THE COMBUSTION CHAMBER OF AN ENGINE

This application is a continuation, of application Ser. No. 626,785, filed July 2, 1984, now abandoned.

FIELD OF THE INVENTION

The present invention relates to a system for blow-by gas return to the combustion chamber of an engine via the intake manifold after separation of oil therefrom in an oil separator.

The present invention may be adapted to systems of the type which commonly comprise a basic arrangement as shown in FIGS. 6, 7, and 8; i.e., the arrangement is provided with an oil separator 2 which comprises an inlet 3 which communicates with an outlet 6 through a diffusion chamber 4 and a filter element 5, which inlet 3 is connected with the crankcase 8 through an inlet line 7, a breather 14, mounted in the engine head cover 13, and an internal engine passage 17. Outlet 6 communicates with an intake manifold 10 of the engine 1 by an outlet line 9.

According to the system of such structures, blow-by gas which leaks from the combustion chamber 11 into the crankcase 8 is guided to the oil separator 2 for cleaning by separating and removing the oil mist while it passes through the diffusion chamber 4 and filter element 5 of the oil separator 2. It then passes through the outlet pipe 9 and is added to the combustion mixture in the intake manifold 10 for return to and burning in the combustion chamber 11.

DESCRIPTION OF THE PRIOR ART

Hitherto, a system of this type, as shown in FIGS. 6 and 7 of the accompanied drawings has been disclosed in U.S. Pat. No. 3,257,995. According to this system, the inlet 7a of the pipe 7 is directly connected to the crankcase 8, and the oil separator 2 is disposed to the side at a position remote from the engine 1.

However, this system has had serious disadvantages as follows:

a. Since the blow-by gas, carrying a large quantity of oil mist, is introduced from the crankcase 8 directly into the oil separator 2 via inlet pipe 7, a large oil separator 2 must be used to separate and remove the total quantity of oil involved. Moreover, since the oil which is not removed from the blow-by gas is introduced into the combustion chamber 11 via outlet pipe 9 and intake manifold 10, there is excessive consumption of the oil by the engine.

Additionally, the unremoved oil mist causes incomplete combustion, and the carbon resulting therefrom contaminates the inner surfaces of the combustion chamber. The exhaust gases thus produced from the incomplete combustion will pollute the atmosphere.

b. If the engine 1 is cold when started, the inlet and outlet pipes 7, 9 are also cold, and they remain cold for some time since they are disposed at some distance from sources of engine heat. When hot blow-by gas from the crankcase 8 passes through these cold pipes 7 and 9, it is chilled and produces water of condensation which is deposited in these pipes 7 and 9.

After the engine is stopped, the water will freeze when very cold conditions prevail, to clog these pipes. The blow-by gas is unable to flow in and out of the crankcase 8 when the engine is re-started, resulting in an increase of pressure in the crankcase.

This can include leakage of oil through various sealed portions of the engine, or blowing away the dip-stick check bar (not shown) inserted into the crankcase 8.

c. As the clogged air cleaner causes a drop in the pressure of the intake manifold 10, the oil in the crankcase 8 tends to be mixed more readily with the blow-by gas therein, and a larger flow than normal is drawn into the intake manifold 10 via the oil separator 2.

To this end, oil will quickly enter the combustion chamber, and engine operation is detrimentally affected.

Moreover, oil will be consumed so fast as to bring about an unexpectedly early depletion of lubricating oil and consequent damage to the engine.

d. When the excessive blow-by gas has been produced, it can quickly force large quantities of the oil from the crankcase 8 in mist form, the oil mist flowing into the combustion chamber 8 via oil separator 2 and intake manifold 10.

This phenomenon also causes a rise in the speed of the engine and causes the engine to stick because of the shortage of oil.

BACKGROUND OF THE INVENTION

The inventors of the present invention previously invented an improved system as shown in FIG. 8, before the present invention, in an effort to try to eliminate these drawbacks of the known prior art.

The improved system comprised the following features in addition to the common basic structure described above.

According to the improved system then proposed, a breather 14 is disposed on the head-cover 13 above the cylinder head 12. The inlet 15 of the breather 14 communicates with the crankcase 8 through a chamber 16 formed on the cylinder head and through a gas passage 17. The outlet 18 of the breather 14 is connected to the separator 2 by inlet pipe 7.

With this system a significant portion of the oil mist carried in the blow-by gas is initially removed as it passes upwardly from the crankcase 8 to the breather 14 through the gas passage 17. More oil mist is then removed as the blow-by gas passes through the breather 14, and final removal is effected by the oil separator 2.

To this end, the oil is surely and finely separated and removed from the blow-by gas, and excess oil consumption is almost completely eliminated. Moreover, in the combustion chamber 11, there is no incomplete combustion caused by an excess intrusion of oil, and no damage to the chamber as a result of excessive carbon. Pollution of the atmosphere by incompletely burned exhaust gas is significantly reduced. Moreover, the oil separator 2 may be much smaller in size.

According to this improved system conceived by the inventors, the drawback described in article subparagraph (c) above might be eliminated, but those described in subparagraphs (b), (c) and (d) still remain.

SUMMARY OF THE INVENTION

Therefore, the present invention is intended to eliminate all of the drawbacks cited in subparagraphs (a) to (d) above. To effect this result, the present invention comprises a system for blow-by gas return to the combustion chamber having a second characteristic structure in addition to the basic structure described above with respect to FIGS. 6–8.

In a system according to the present invention, an oil separator 2 is fixed on the intake manifold 10. An inlet pipe 7 communicates with a breather 14 and oil separator 2, and an outlet pipe 9 between the oil separator 2 and the intake manifold 10 is disposed directly over the cylinder head 12 and the intake manifold 10.

According to the present invention, when the engine is running, said inlet and outlet pipes, 7 and 9, disposed over said cylinder head 12 and said intake manifold 10, are heated by heat radiation from said cylinder head 12 and the intake manifold 10. Therefore, the blow-by gas is not chilled very much in these pipes when it is passing through them, and the condensation of water therein is significantly reduced.

According to the present invention, a diffusion chamber 4 of said oil separator 2 communicates with the atmosphere via an atmospheric passage 19.

According to this arrangement of the present invention, when the pressure in said intake manifold 10 is low, outside air is introduced into said oil separator 2 through said passage 19. Thus, the low pressure of said intake manifold 10 will not act directly on said breather 14 or the crankcase 8, and strong suction acting on the flow of blow-by gas from said crankcase 8 to said intake manifold 10 via said oil separator 2 will be aborted.

Moreover, when unusually large quantities of blow-by gas are produced, the oil will be separated in the passage en route to said breather 14, then further separated in said breather 14; thus the outflow of large quantities of oil from the crankcase 8 is prevented. Unusually large quantities of blow-by gas will flow out into the atmosphere from oil separator 2 through atmospheric passage 19, and will not be forced to go into intake manifold 10 and combustion chamber 8.

Thus, the system of the present invention, as described above, has the following advantages:

A. The present invention has all advantages of the improved system previously conceived by the inventors of the present invention, as illustrated in FIGS. 7 and 8, i.e.:

The separation of oil from the blow-by gas is effected not only by the oil separator, but in the passageway from the crankcase to the breather, and also by passage through the breather.

Therefore, the resultant consumption of oil is almost eliminated. Moreover, incomplete combustion in the combustion chamber by the introduction of oil is reduced to a minimum to prevent damage to the combustion chamber by excess carbon, and also pollution of the atmosphere by the exhaust gas produced under the incomplete combustion is prevented. Furthermore, an oil separator of small size may be utilized.

B. The production and deposit of water by condensation is prevented by means of applying the radiation and convection of engine heat to the inlet and outlet pipes of the separator while the engine operates in a cold atmosphere.

As a result, the inlet and outlet pipes are not clogged by frozen condensed water when the engine is restarted, and the leakage of oil from the various sealed portions of the engine is eliminated, as well as the chance of blowout of the dip-stick oil checking bar inserted onto the crankcase.

C. Withdrawal of unusually large quantities of blow-by gas by suction is eliminated by introducing outside air to the oil separator though the atmospheric passage, in spite of higher back pressure from the intake manifold, produced by the clogging of the air cleaner.

Thus, the oil will not be drawn into the combustion chamber quickly in large quantities, and the irregular functioning of the engine by by suction of oil is prevented, thereby keeping a stable speed of engine under all conditions. Moreover, rapid consumption of the oil is prevented and the clogging of the engine by shortage of oil is also prevented.

D. In case of unusual increase in blow-by gas, the oil involved therein is initially separated as it rises up to the breather, and returns from the breather in large quantities to the crankcase. Thus, the consumption of oil is greatly reduced, and clogging of the engine due to a shortage of oil is more positively prevented.

Moreover, any unusual quantities of blow-by gas will not be returned to the intake manifold and the combustion chamber, because of outflow to the atmosphere through the atmospheric passage of the oil separator. Thus, the speed of engine is kept stable and normal, without disruption of the normal engine functions.

BRIEF DESCRIPTION OF THE DRAWINGS

The present invention will be understood more clearly by a reading of the following description, with reference to the accompanying drawings, in which:

FIG. 1 is a vertical sectional front view of the vertical water cooling engine, which embodies a system according to the present invention.

FIG. 2 is a plan view of the engine shown in the FIG. 1.

FIG. 3 is a vertical sectional front view of the oil separator used in the system according to FIGS. 1 and 2.

FIG. 4 is a cross sectional view along lines IV—IV of FIG. 3.

FIG. 5 is a vertical sectional front view of another embodiment of an oil separator according to the present invention.

FIG. 6 is a side elevational view of the engine using a system according to the prior art.

FIG. 7 is a vertical sectional view of an oil separator in accordance with FIG. 6.

FIG. 8 is a vertical sectional view of a prior art engine using an improved system conceived by the inventors prior to their present invention.

DETAILED DESCRIPTION OF THE PREFERRED EMBODIMENTS

Referring now to FIGS. 1 and 2, the engine 1 embodying a preferred system according to the present invention comprises a crankcase 20. A cylinder block 22 formed integrally on the crankcase contains one or more vertically reciprocating pistons 21 and a cylinder head 12 covering the open upper end of the cylinder block 22 to define a combustion chamber 11 over each piston 21.

Each combustion chamber 11 is provided with intake and exhaust passages 23 and 24 formed in the head block 12, and each passage 23 and 24 is provided with an intake or an exhaust valve 25.

Each intake or exhaust valve 25 is adapted to communicate the combustion chamber 11 with intake or exhaust passages 23 or 24 when it is actuated by a rocker arm 30 driven by a push rod 29. The push rods 29 are driven through intermediate tappets 28, by valve driving cams 27 which rotate at one-half the speed of a crank shaft 26. The rocker arms 30 and stem portions of intake and exhaust valves 25 are covered with a head cover 13, which forms therewith a head cover chamber 16.

A breather 14 is provided on a part of top wall 13a of the head cover 13. The breather 14 has a casing 31 formed integrally with head cover 13. The breather 14 comprises a buffer plate 32, an oil separating element 33 and a fixed plate 34 positioned with respect to casing 31 to form an inlet 15. Plate 34 also serves to hold the buffer plate 32 and the element 33 in position by attachment to the internal surface of the top wall 13a of the head cover 13. The inlet 15 of the breather 14 communicates with the crankcase 8 through the head cover chamber 16 to a gas passage 17. The outlet 18 of the breather 14 communicates with oil separator 2 by inlet pipe 7.

The oil separator 2 is disposed over the engine 1, being offset from a position directly above the intake manifold 10 to a position nearer to the center of the engine. An oil separator supporting bracket 36 is mounted on an installation boss 35 which extends from the upper surface of the intake manifold 10, the latter connecting and communicating with an intake passage 23 through a side surface of the cylinder head 12.

The interior structure of the oil separator is illustrated in FIGS. 3 and 4. The oil separator according to this embodiment of the present invention comprises a case 37, in which there are a plurality of chambers defined by porous plates 38. The lower two chambers 4a, 4b comprise the diffusion section of chamber 4. The next upper chamber is provided with a filter element 5, for example of steel wool, so as to function as an oil separating chamber 41. The top chamber comprises a gathering chamber 53.

The oil separator 2 has an inlet 3 to which is attached an end 7a of the inlet pipe 7 connected with the outlet 18 of the breather 14. An oil drain port 46 is disposed in the bottom wall 37a of the case 37, to return lubrication oil separated in the oil separator 2 to the oil supply space 45 in the oil pan 44, through an oil return pipe 43. The lower end portion 43a of the oil return pipe 43 is submerged in the lubrication oil in oil pan 44 to prevent reverse flow of the blow-by gas from the crankcase 8, at times when pressure in the intake manifold 10 is low. The outlet pipe 9 is connected to an outlet 6 disposed in covering plate 51 above the collecting chamber 53.

An atmospheric passage 19 which communicates the diffusion chamber 4 with the atmosphere is provided by pipe 47 which extends through the peripheral wall 37b of the diffusion chamber 4b disposed in the second portion of casing 37. The outer end of this passage 19 is shielded with a dust cover 48 fastened on the upper portion of the pheripheral wall 37b of the case 37.

The covering plate 51 is fastened to the top of case 37 by a tightening nut 50 screwed onto a stud bolt 49 attached to the bottom wall 37a of the case 37.

The inlet pipe 7 connecting the breather 14 with the oil separator 2, and the outlet pipe 9 connecting the oil separator 2 with the intake manifold 10 are disposed directly over the cylinder head 12 and the intake manifold 10. The numeral 52 designates an exhaust manifold.

Blow-by gas which leaks from the combustion chamber 11 into the crankcase chamber 8 flows into the head cover chamber 16 via gas passage 17 to form a communicating passage 54 between chamber 53 and the crankcase 8, and a passage 55 through which the push rod extends. Then the gas passes through breather 14 entering at inlet 15 and passes through the oil separating element 33 and the buffer plate 32. A significant portion of the oil mist carried by the blow-by gas is separated at this point. It drips back by gravity into the head cover chamber 16 through inlet 15.

From the outlet 18 of the breather 14 the blow-by gas then passes to the diffusion chamber 4 of the oil separator 2 through the inlet pipe 7. In the oil separator 2, the oil carried in the blow-by gas is further separated as the blow-by gas passes through the porous plates 38 in diffusion chamber 4 and through the filter element 5. Thus, the lubrication oil carried in the blow-by gas is almost completely separated therefrom, and only blow-by gas minus the oil mist will be drawn or delivered intake manifold 10.

The oil separated in oil separator 2 from the blow-by gas is returned to the chamber 45 of oil pan 44 through oil return pipe 43.

At times when the air cleaner may become clogged, pressure in the intake manifold 10 becomes lower than usual and this tends to draw the blow-by gas into the intake manifold 10 before the oil has been sufficiently separated in the breather 14 and the oil separator 2. However, in such instances, outside air is drawn into the diffusion chamber 4 of oil separator 2 through the atmospheric passage 19, and the low pressure of the intake manifold 10 is not imposed directly into the head cover chamber 16 of the engine.

Another embodiment of the oil separator 2 is shown in FIG. 5. This oil separator 2 comprises a casing 37 and a cover plate 48, over the upper opening of the casing 37. Both may be made of sheet metal or plastics.

Obviously, the invention according to the arrangements described above is not limited by the embodiments described. For example, the engine may be V-shape or multi-cylinder type, or side-valve type, if the inlet and outlet pipes of the oil separator are disposed over the engine between intake and exhaust manifolds so as to receive heat by radiation or convection from the engine, and thereby preclude freezing of any condensed water carried therein.

In case of side-valve engine, the breather may be mounted on the cylinder head, and the breather may be connected with the crankcase by a communicating pipe.

We claim:

1. A system for blow-by gas return to the combustion chamber of an engine having an air filter, the engine also having an oil separator with an inlet and an outlet that communicate with each other through a diffusion chamber and a filter element therein, with said inlet communicating with the crankcase via an inlet pipe and said outlet communicating with the intake manifold of the engine via an outlet pipe, the system comprising:

a breather disposed on a cylinder head cover of said crankcase and communicating therewith through an internal engine passage, the breather having an outlet communicating with an inlet end of said inlet pipe communicating with the oil separator;

fixing means separate from said inlet and outlet pipes for fixing said oil separator upon said intake manifold in a position to receive heat from the engine during use;

said inlet pipe communicating said breather with said oil separator and said outlet pipe communicating said oil separator to said intake manifold being disposed in a space over said cylinder head and said intake manifold to receive heat therefrom during use; and an atmospheric passage enabling communication between said diffusion chamber in said oil separator and the atmosphere to enable an air flow received through the atmospheric passage to mingle with a flow of blow-by gas from which entrained oil has been substantially removed when the intake manifold pressure is below a predetermined low value and to enable outflow of said blow-by gas to the atmosphere through the atmospheric passage when said pressure of said flow of blow-by gas flowing from the engine crankcase to the diffusion chamber of the oil separator exceeds a predetermined high value.

2. The system recited in claim 1, wherein:

said oil separator includes an oil separating chamber in which a filter element is disposed and a gathering chamber above the oil separating chamber in alignment therewith;

said diffusion chamber being in communication with said inlet pipe, and said gathering chamber being in communication with said outlet pipe with said oil separating chamber being between said gathering chamber and said diffusion chamber.

3. A system for blow-by gas return to the combustion chamber of an engine having an oil separator with an inlet communicated with an outlet through a diffusion chamber and a filter element, said inlet communicating with the crankcase by an inlet pipe, and said outlet communicating with the intake manifold of the engine by an outlet pipe, comprising:

a breather disposed on the cylinder head cover of said crankcase by an internal engine passage, and an outlet communicating with an inlet end of said inlet pipe;

fixing means separate from said inlet and outlet pipe for fixing said oil separator upon said intake manifold;

said inlet pipe communicating with said breather and with said oil separator, and an outlet pipe which connects said oil separator to said intake manifold disposed in a space over said cylinder head and said intake manifold;

said diffusion chamber in said oil separator in communication with the atmosphere by an atmospheric passage, wherein said oil separator includes an oil separating chamber in which a filter element is disposed and a gathering chamber above the oil separating chamber in alignment therewith, said diffusion chamber being in communication with said inlet pipe, and said gathering chamber being in communication with said outlet pipe with said oil separating chamber between said gathering chamber and said diffusion chamber, and said diffusion chamber is divided into a plurality of sub-chambers defined by one or more porous plates, a lowermost sub-chamber of said diffusion chamber communicating with said inlet pipe, and the inner opening of said atmospheric passage communicating with an upper sub-chamber.

4. A system for blow-by gas return to the combustion chamber of an engine having an oil separator with an inlet communicated with an outlet through a diffusion chamber and a filter element, said inlet communicating with the crankcase by an inlet pipe, and said outlet communicating with the intake manifold of the engine by an outlet pipe, comprising:

a breather disposed on the cylinder head cover of said crankcase by an internal engine passage, and an outlet communicating with an inlet end of said inlet pipe;

said oil separator being fixed upon said intake manifold;

said inlet pipe communicating with said breather and with said oil separator, and an outlet pipe which connects said oil separator to said intake manifold disposed in a space over said cylinder head and said intake manifold; and said diffusion chamber in said oil separator in communication with the atmosphere by an atmospheric passage, wherein said atmospheric passage is formed by a communicating pipe extending through the peripheral wall of said diffusion chamber of said oil separator.

5. A system for blow-by gas return to the combustion chamber of an engine having an oil separator with an inlet communicated with an outlet through a diffusion chamber and a filter element, said inlet communicating with the crankcase by an inlet pipe, and said outlet communicating with the intake manifold of the engine by an outlet pipe, comprising:

a breather disposed on the cylinder head cover of said crankcase by an internal engine passage, and an outlet communicating with an inlet end of said inlet pipe;

said oil separator being fixed upon said intake manifold;

said inlet pipe communicating with said breather and with said oil separator, and an outlet pipe which connects said oil separator to said intake manifold disposed in a space over said cylinder head and said intake manifold; and said diffusion chamber in said oil separator in communication with the atmosphere by an atmospheric passage, wherein a dust cover is provided to cover said peripheral wall of said oil separator, and said atmospheric passage opens into the space between said dust cover and the casing of said oil separator.

* * * * *